(12) United States Patent
Varvarezis (10) Patent No.: US 10,380,578 B2
(45) Date of Patent: Aug. 13, 2019

(54) SYSTEMS AND METHODS FOR PROVIDING NEAR FIELD COMMUNICATIONS

(71) Applicant: Capital One Financial Corporation, McLean, VA (US)

(72) Inventor: Panayiotis Varvarezis, Glenolden, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/813,554

(22) Filed: Nov. 15, 2017

(65) Prior Publication Data
US 2018/0075436 A1    Mar. 15, 2018

Related U.S. Application Data

(63) Continuation of application No. 14/025,197, filed on Sep. 12, 2013, now Pat. No. 9,852,419.

(60) Provisional application No. 61/702,230, filed on Sep. 17, 2012.

(51) Int. Cl.
  *G06Q 40/00* (2012.01)
  *G06Q 20/32* (2012.01)

(52) U.S. Cl.
  CPC ....... *G06Q 20/327* (2013.01); *G06Q 20/3278* (2013.01)

(58) Field of Classification Search
  CPC .................................................. G06Q 40/00
  USPC .......................................................... 705/35
  See application file for complete search history.

(56) References Cited

U.S. PATENT DOCUMENTS

| | | | | |
|---|---|---|---|---|
| 7,099,850 B1* | 8/2006 | Mann, II | ................ | G06Q 20/16 380/28 |
| 7,689,508 B2* | 3/2010 | Davis | ..................... | G06Q 20/10 455/406 |
| 7,717,346 B2* | 5/2010 | Smets | .................. | G01R 31/302 235/380 |
| 8,171,525 B1* | 5/2012 | Pelly | ...................... | H04L 9/083 726/2 |
| 8,452,654 B1* | 5/2013 | Wooters | ............ | G06Q 30/0234 705/14.34 |
| 8,583,549 B1* | 11/2013 | Mohsenzadeh | ...... | G06Q 20/227 705/38 |
| 8,606,640 B2* | 12/2013 | Brody | ................ | G06Q 20/0655 705/26.1 |
| 9,317,689 B2* | 4/2016 | Aissi | ....................... | G06F 21/30 |
| 2004/0122685 A1* | 6/2004 | Bunce | ................... | G06Q 20/04 705/67 |
| 2005/0187873 A1* | 8/2005 | Labrou | .................. | G06Q 20/02 705/40 |
| 2005/0250538 A1* | 11/2005 | Narasimhan | .......... | G06Q 20/12 455/558 |

(Continued)

*Primary Examiner* — Kirsten S Apple
(74) *Attorney, Agent, or Firm* — Finnegan, Henderson Farabow, Garrett & Dunner, LLP (57) ABSTRACT

Methods and systems are disclosed for providing Near Field Communications. In certain embodiments, an Android mobile operating system based mobile device is configured with software that, when executed by one or more processors, determines whether the mobile device is to perform an NFC communication with a contactless payment terminal (CPT) using a secure element associated with an NFC controller included in the mobile device. Based on the determination, the mobile device is configured to execute software that performs communications with the CPT using the NFC controller.

17 Claims, 4 Drawing Sheets

(56) References Cited

U.S. PATENT DOCUMENTS

| | | | |
|---|---|---|---|
| 2006/0208065 A1* | 9/2006 | Mendelovich | G06Q 20/04 235/380 |
| 2007/0198436 A1* | 8/2007 | Weiss | G06F 21/32 705/75 |
| 2007/0255564 A1* | 11/2007 | Yee | G10L 17/24 704/246 |
| 2008/0238625 A1* | 10/2008 | Rofougaran | H04B 5/0012 340/10.1 |
| 2010/0191570 A1* | 7/2010 | Michaud | G06Q 30/02 705/7.33 |
| 2010/0205091 A1* | 8/2010 | Graziano | G06Q 20/102 705/40 |
| 2010/0222021 A1* | 9/2010 | Balsan | G06Q 20/18 455/406 |
| 2010/0223145 A1* | 9/2010 | Dragt | G06Q 20/20 705/17 |
| 2010/0271177 A1* | 10/2010 | Pang | G06K 7/10019 340/10.1 |
| 2010/0279606 A1* | 11/2010 | Hillan | H04B 5/00 455/41.1 |
| 2010/0332387 A1* | 12/2010 | Tanner | G06Q 20/105 705/41 |
| 2011/0201306 A1* | 8/2011 | Ali Al-Harbi | G06F 21/42 455/411 |
| 2012/0271712 A1* | 10/2012 | Katzin | G06Q 30/06 705/14.51 |
| 2013/0030934 A1* | 1/2013 | Bakshi | G06Q 20/40 705/18 |
| 2014/0086301 A1* | 3/2014 | Akhavan | H04L 25/03828 375/238 |
| 2014/0114858 A1* | 4/2014 | Adams | G06Q 20/105 705/44 |
| 2014/0164082 A1* | 6/2014 | Sun | G06Q 30/0214 705/14.16 |
| 2014/0214687 A1* | 7/2014 | Huxham | H04L 63/10 705/70 |
| 2014/0244365 A1* | 8/2014 | Price | G07B 15/00 705/13 |
| 2015/0220924 A1* | 8/2015 | Bakker | G06Q 20/4014 705/14.27 |

* cited by examiner

SYSTEMS AND METHODS FOR PROVIDING NEAR FIELD COMMUNICATIONS

PRIORITY CLAIM

This application is a continuation of U.S. application Ser. No. 14/025,197, filed Sep. 12, 2013, which claims priority to U.S. provisional patent application No. 61/702,230, filed on Sep. 17, 2012. The disclosures of the above-referenced applications are expressly is incorporated herein by reference in their entireties.

TECHNICAL FIELD

The disclosed embodiments generally relate to communication systems and, more particularly, to processes and systems for providing near field communications with or without the use of a secure element.

BACKGROUND

Currently, mobile device operating systems are configured to detect only a handful of ISO-14443 device types to facilitate near-field communications (NFCs). NFC is a short-range radio technology that enables wireless communication between devices. NFC is an open-platform technology and is based on and extends on RFID technologies. But some devices using the ISO-14443 standard, including Proximity Coupling Devices (PCDs), remain unsupported by certain operating systems, such as Android™. Thus, to detect and use these unsupported devices, use of a secure element, which provides an environment in which data/processes may be securely stored and/or executed, must be sacrificed.

Accordingly, there is a need for systems and processes that enable devices, such as mobile devices using an Android™ operating system, to communicate with PCDs using a secure element.

SUMMARY

Methods and systems consistent with the disclosed embodiments provide NFC capabilities through software that, when executed by a processor, allow a mobile device to request that a PCD be detected, and ultimately communicated with, using a secure element despite employing an operating system that does not support PCDs. According to some embodiments, the mobile device may initialize a discovery mode to detect and ultimately communicate with a PCD to perform a transaction, such as a financial transaction, with or without the secure element.

Additional objects and advantages will be set forth in part in the description which follows, and in part will be obvious from the description, or may be learned by practicing embodiments of the present disclosure. The objects and advantages will be realized and attained by means of the elements and combinations particularly pointed out in the appended claims.

Consistent with disclosed embodiments, a mobile device for processing transactions is disclosed. The mobile device may comprises a processor and memory storing instructions that, when executed by the processor, perform operations. The operations performed by the mobile device may include initializing a discovery mode to detect the contactless payment terminal and, once detected, identifying a near field communication protocol associated with the con tactless payment terminal. The operations performed by the mobile device may also include providing a selection to the user regarding whether or not to use a secure element to perform the transaction when the near field communication protocol is not supported by an operating system associated with the mobile device. Finally, the operations performed by the mobile device may include conducting the transaction based at least on the user selection.

Consistent with disclosed embodiments, a method is disclosed for processing transactions. The method may comprise initializing a discovery mode to detect the contactless payment terminal and identifying a near field communication protocol associated with the contactless payment terminal. The method may also include providing a selection to the user regarding whether or not to use a secure element to perform the transaction when the near field communication protocol is not supported by an operating system associated with the mobile device. Finally, the method may include conducting the transaction based at least on the user selection.

Consistent with disclosed embodiments, a non-transitory computer-readable medium is disclosed storing instructions that, when executed by a processor, cause the processor to perform operations. The operations may include initializing, via one or more processors, a discovery mode to detect the contactless payment terminal. Further, the operations may include identifying a near field communication protocol associated with the contactless payment terminal and providing a selection to the user regarding whether or not to use a secure element to perform the transaction when the near field communication protocol is not supported by an operating system associated with the mobile device. Finally, the operations may include conducting, via the one or more processors, the transaction based at least on the user selection.

Consistent with other disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
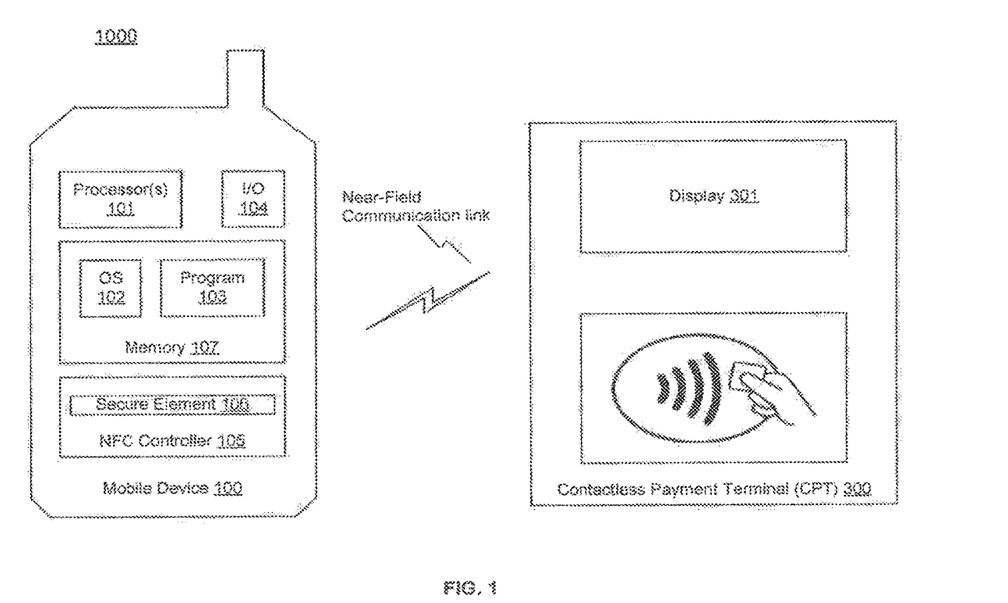
FIG. 1 is a diagram of an exemplary system that may be used to implement the disclosed embodiments.

FIG. 1 shows an exemplary system 100 that is configured to perform one of more software processes that, when executed by a processor, provide one or more aspects of the disclosed embodiments. The components and arrangements shown in FIG. 1 are not intended to be limiting to the disclosed embodiment, as the components used to implement the disclosed processes and features disclosed here may vary.

In one embodiment, system 10000 includes a mobile device 100 and contactless payment terminal (CPT) 300. The components of mobile device 100 may be implemented in hardware, software, or a combination of both hardware and software, as will be apparent to those skilled in the art. In accordance with certain disclosed embodiments, mobile device 100 may be a mobile computer-based system, such as, for example, cellular telephone, tablets, hand held computing devices (e.g., smart phones), tablets, laptops, and any other type of mobile computer-based system. Alternatively, mobile device 100 may be configured as a particular apparatus, embedded system, dedicated circuit, and the like based on the storage, execution, and/or implementation of the software instructions that perform one or more operations consistent with the disclosed embodiments. According to some embodiments, mobile device 100 may include one or more processors 101, memory 107 storing an operating system 102 and one or more software programs 103, an input/output component 104, and a near field communication (hereinafter "NFC") controller 105 with a secure element 106. For example, mobile device 100 may be a contactless integrated circuit cards using the ISO-14443 standard. In other embodiments, mobile device 100 may be an NFC-enabled smart phone emulating a contactless financial card or keyfob. Other components known to one of ordinary skill in the art may be included in mobile device 100 to process, transmit, provide, and receive information consistent with the disclosed embodiments.

Processor(s) 101 may be one or more known processing devices, such as a microprocessor from the Pentium™ family manufactured by Intel™ or the Turion™ family manufactured by AMD™. Processor(s) 101 may include a single core or multiple core processor system that provides the ability to perform parallel processes simultaneously. For example, processor 101 may be a single core processor that is configured with virtual processing technologies known to those skilled in the art. In certain embodiments, processor 101 may use logical processors to simultaneously execute and control multiple processes. Processor 101 may implement virtual machine technologies, or other similar known technologies to provide the ability to execute, control, run, manipulate, store, etc. multiple software processes, applications, programs, etc. In another embodiment, processor(s) 101 may include a multiple-core processor arrangement (e.g., dual or quad core) that is configured to provide parallel processing functionalities to allow mobile device 100 to execute multiple processes simultaneously. One of ordinary skill in the art would understand that other types of processor arrangements could be implemented that provide for the capabilities disclosed herein.

Mobile device 100 may include one or more storage devices configured to store information used by processor 101 (or other components) to perform certain functions related to the disclosed embodiments. As discussed above, for example, memory 107 may store instructions to enable processor(s) 101 to execute software, such as one or more applications, network communication processes, operating system software, and any other type of application or software known to be available on mobile devices. Memory 107 may be a volatile or non-volatile, magnetic, semiconductor, tape, optical, removable, nonremovable, or other type of storage device or tangible computer-readable medium. In one embodiment, operating system 102 is an Android™ operating system for mobile devices.

NFC controller 105 may be a device with logic that is configured to execute NFC-related operations. Alternatively, NFC controller 105 may be software that is stored in memory 107, or a separate memory device in mobile device 100. NFC controller 105 may operate and be configured according to architectures and designs known to one of ordinary skill in the art. In one embodiment, NFC controller 105 includes a secure element 106 providing an environment in which processes and data may be securely stored and/or executed. In other embodiments, secure element 106 may be separate from NFC controller 105, such as a separate embedded device in the mobile device, a SIM/UICC card that functions as the secure element, or software located in memory that may or may not be the same memory that hosts NFC controller 105. For example, secure element 106 may provide delimited memory for applications operating according to disclosed embodiments. In certain embodiments, secure element 106 is configured and operates as known secure elements for NFC devices. For example secure element 106 may store applications, credentials (e.g., usernames and/or passwords), and/or other information associated with secure execution of applications.

I/O 104 may be one or more components that enable mobile device 100 to communicate with external devices. I/O 104 may include input/output components known to those skilled in the art. For example, I/O devices 104 may be one or more devices configured to allow data to be received and/or transmitted by mobile device 100. I/O devices 304 may include one or more digital and/or analog devices that allow mobile device 100 to communicate with other machines and devices, such as other components of systems 1000. For example, I/O devices 104 may include a screen for displaying NFC communication payment methods or providing information to the user. I/O devices 104 may also include one or more digital and/or analog devices that allow a user to interact with mobile device 100, such as a touch-sensitive area, buttons, or microphones. I/O devices 104 may also include one or more accelerometers to detect the orientation and inertia of mobile device 100. I/O devices 104 may also include other components known in the art for interacting with other components of system 1000.

Contactless payment terminal (CPT) 300 may be any known NFC device designed to communicate with mobile device 100. For example, CPT 300 may be a "contactless payment terminal," such as point of sale terminal, automated teller machine, signage, RFID or similar tag mounted on any type of equipment, product, person, and the like, or any other device that is configured to communicate with NFC mobile devices to facilitate a financial transaction that are known in the art. As shown, in some embodiments, CPT 300 may include a display 301. Display 301 may show information regarding transactions, such as amounts due for a purchase and may further display information confirming receipt of payment.

Figure 2:
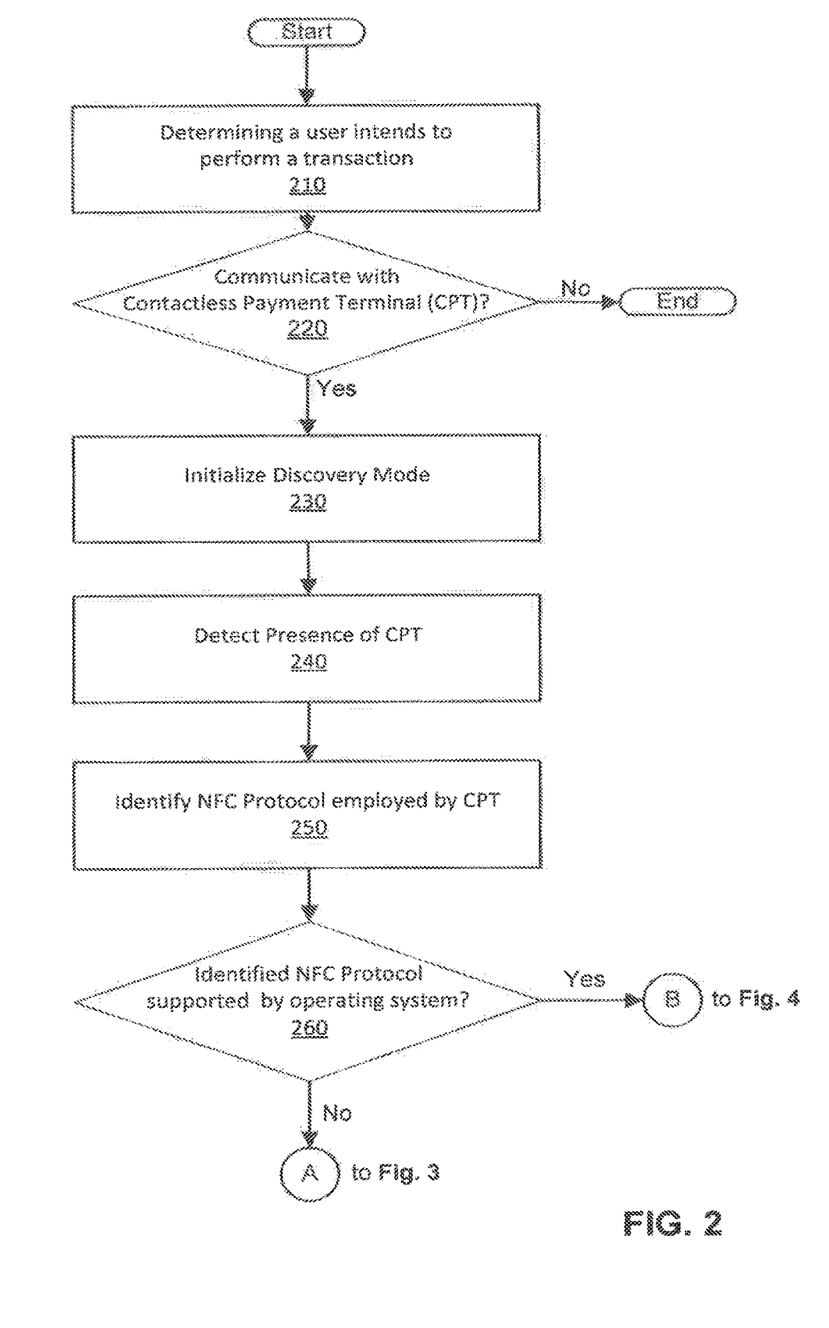
FIG. 2 is a flowchart of an exemplary process flow consistent with the disclosed embodiments.

FIG. 2 shows a flowchart of an exemplary process that may be performed by mobile device 100 consistent with certain embodiments. In one aspect, processor(s) 101 may execute software stored in memory 107 (or another memory) to perform NFC communications consistent with the disclosed embodiments. For exemplary purposes, disclosed embodiments are discussed in the context of financial transactions. Disclosed embodiments, however, are not limited to financial transactions and may include, for example, product tracking, information collecting (e.g., retrieving data from a sign, document, etc. configured with CPT capabilities), etc.

At step 210, mobile device 100 may be configured to execute software that receives a user command to initiate a financial transaction. For example, the mobile device may have received a user command to initiate a program associated with NFC and/or financial transactions. In other embodiments, mobile device 100 may become prompted by a message from CPT 300 regarding a potential upcoming financial transaction. At step 220, mobile device 100 may generate a query that is presented on a display device of mobile device 100. In one aspect, the query may request a response indicating whether mobile device 100 is to communicate with a CPT (e.g., CPT 300) using the NFC secure element 106. Mobile device 100 may then receive an indication in response to the query whether further communication with the CPT 300. If the response indicates that communication should be made (step 220; NO), the process may end. Otherwise (step 220; YES), mobile device 100 may execute software to initiate a discovery mode to identify one or more CPTs 300 with which to communicate (step 230). Upon detection of at a CPT 300 (step 240), mobile device 100 may execute software to identify the NFC protocol employed by the CPT 300 (step 250).

Figure 4:
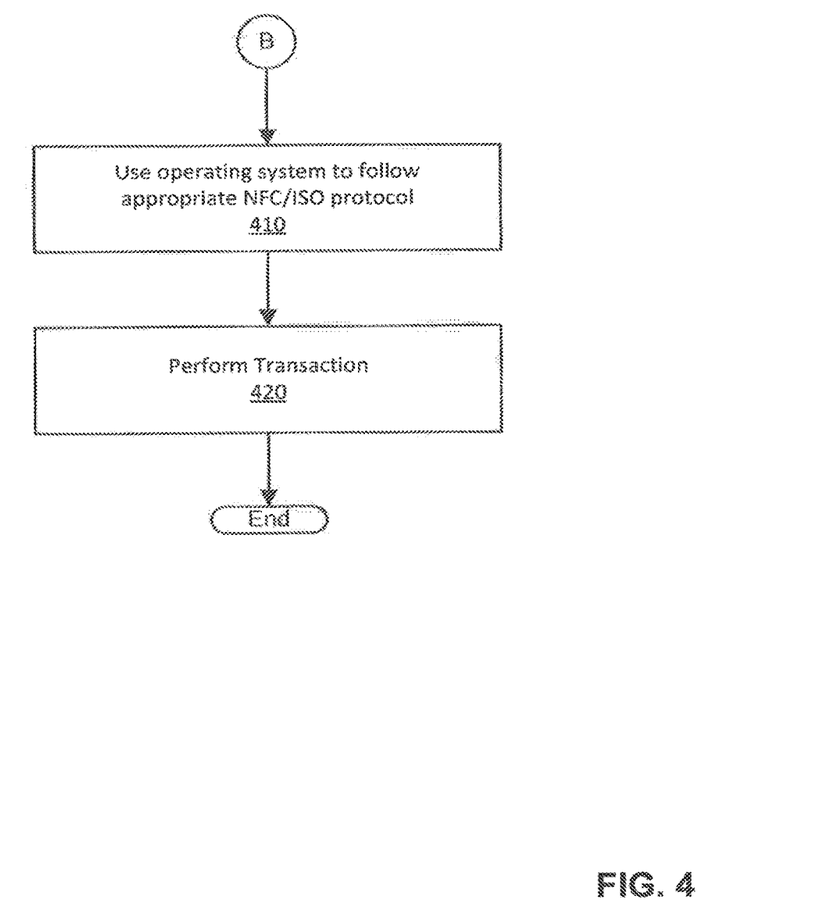
FIG. 4 is a flowchart of an exemplary process flow consistent with the disclosed embodiments.

If the identified NFC protocol is supported by the operating system of mobile device 100 (step 260; YES), the process may continue as shown in FIG. 4. As shown in FIG. 4, the mobile device 100 may use the operating system to follow the appropriate NFC communication and/or ISO standards (step 410) to perform one or more transactions with the detected CPT 300 (step 420). According to some embodiments, any type of transaction may be performed, such as financial, product tracking, information collecting (e.g., retrieving data from a sign, document, etc. configured with CPT capabilities), etc.

Figure 3:
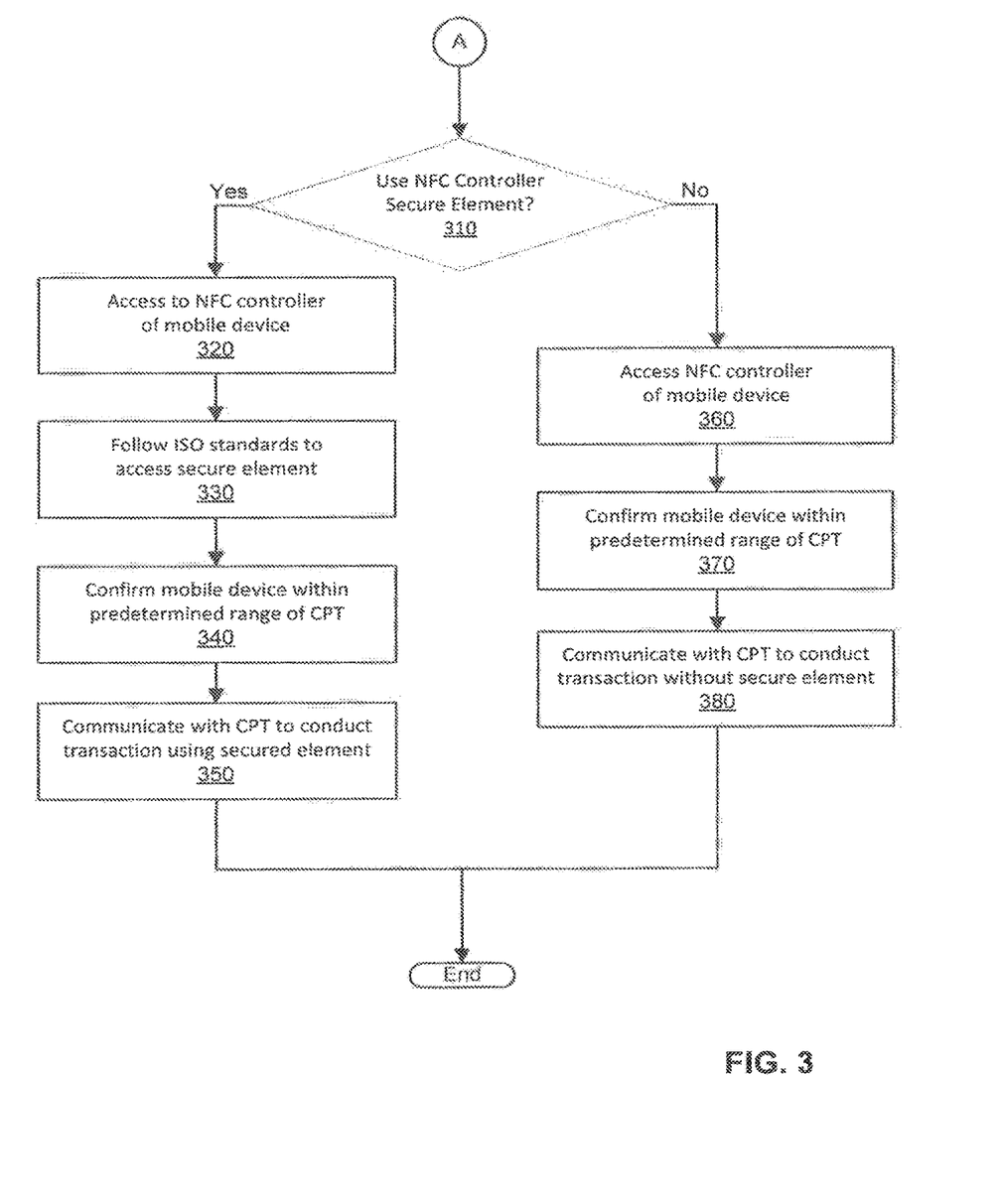
FIG. 3 is a flowchart of an exemplary process flow consistent with the disclosed embodiments.

If the identified NFC protocol is not supported by the operating system of mobile device 100 (step 260; NO), the process may continue as shown in FIG. 3. According to some embodiments, mobile device 100 may employ an Android™ operating system that lacks support for the detected PCT's NFC protocol of ISO-14443 used for PCDs. As shown in FIG. 3, mobile device 100 may execute software that prompts the user as to whether the secure element should be used to communicate with CPT 300 (step 310). If mobile device 100 receives an indication that the secure element should be used (step 310; YES), mobile device 100 access an NFC controller associated with mobile device 100 (step 320). Mobile device 100 may also execute software that conforms to the ISO standards associated with the identified NFC protocol to access the secured element (step 330). Mobile device 100 may also execute software to confirm the mobile device is within a predetermined range of the CPT 300 (step 340) and, once confirmed, may communicate with the CPT 300 to conduct a transaction using the secure element (step 350). In some aspects, the predetermined range is determined by the identified NEC protocol and/or associated ISO standard. According to some embodiments, any type of transaction may be performed, such as financial, product tracking, information collecting (e.g., retrieving data from a sign, document, etc. configured with CPT capabilities), etc.

If mobile device 100 receives an indication that the secure element should not be used (step 310; NO), mobile device 100 may access an NFC controller associated with mobile device 100 (step 360). Mobile device 100 may also execute software to confirm the mobile device is within a predetermined range of the CPT 300 (step 370) and, once confirmed, may communicate with the CPT 300 to conduct a transaction using the secure element (step 380). In some aspects, the predetermined range is determined by the identified NFC protocol and/or associated ISO standard. According to some embodiments, any type of transaction may be performed, such as financial, product tracking, information collecting (e.g., retrieving data from a sign, document, etc. configured with CPT capabilities), etc.

The disclosed embodiments, in certain aspects, may be implemented with mobile devices configured to execute the Android™ operating system for mobile devices. Typical Android™ based NFC devices are not configured to perform communications with CPTs without going through a secure element. Aspects of the disclosed embodiments enable such Android™ based NFC devices to selectively perform secure element communications in accordance with known ISO standards or non-secure element communications.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for performing a wireless communication, comprising:
   one or more memory devices storing instructions; and
   one or more processors configured to execute the instructions to perform operations comprising:
      initiating a discovery mode to identify a contactless terminal;
      identifying a wireless protocol associated with the contactless terminal;
      determining whether the wireless protocol is supported by an operating system associated with the system;
      when the wireless protocol is supported by the operating system:
         communicating with the contactless terminal according to the wireless protocol; and when the wireless protocol is not supported by the operating system:
receiving an instruction to use a secure communication with the contactless terminal,
initiating a secure element, the secure element executing instructions that conform to the wireless protocol; and
communicating with the contactless terminal using the secure element,
wherein,
initiating a secure element comprises
determining a distance between the system and the contactless terminal; and
communicating with the contactless terminal using the secure element comprises communicating information relating to a transaction, when the distance between the system device and the contactless terminal is within a predetermined range, based on the wireless protocol.

2. The system of claim 1, wherein the system is a mobile device comprising a near field communication (NFC) controller; and
the NFC controller comprises the secure element.

3. The system of claim 1, wherein the secure element comprises at least one of a subscriber identification module (SIM) card or a universal integrated circuit card (UICC).

4. The system of claim 2, wherein:
the mobile device is an NFC-enabled smartphone;
the contactless terminal comprises one of a point of sale terminal, an automated teller machine, or an RFID tag; and
the contactless terminal is configured to communicate with NFC-enabled devices.

5. The system of claim 1, wherein when the wireless protocol is not supported by the operating system, the operations further comprise displaying a selection message, the selection message requesting instructions as to whether the secure element should be used.

6. The system of claim 1, wherein the secure element comprises a delimited memory storing:
instructions that conform with wireless protocols; and
credential information.

7. A computer-implemented method for performing a wireless communication with a system, the method comprising:
initiating a discovery mode to identify a contactless terminal;
identifying a wireless protocol associated with the contactless terminal;
determining whether the wireless protocol is supported by an operating system associated with the system;
when the wireless protocol is supported by the operating system:
communicating with the contactless terminal according to the wireless protocol; and
when the wireless protocol is not supported by the operating system:
receiving an instruction to use a secure communication with the contactless terminal;
initiating a secure element, the secure element executing instructions that conform to the wireless protocol; and
communicating with the contactless terminal using the secure element;

wherein
initiating a secure element comprises
determining a distance between the system and the contactless terminal; and
communicating with the contactless terminal using the secure element comprises communicating information relating to a transaction, when the distance between the system and the contactless terminal is within a predetermined range, based on the wireless protocol.

8. The computer-implemented of claim 7, wherein:
the system is a mobile device comprising a near field communication (NFC) controller; and
the NFC controller comprises the secure element.

9. The computer-implemented of claim 7, wherein the secure element comprises at least one of a subscriber identification module (SIM) card or a universal integrated circuit card (UICC).

10. The computer-implemented method of claim 8, wherein the mobile device is an NFC-enabled smartphone;
the contactless terminal comprises one of a point of sale terminal, an automated teller machine, or an RFID tag; and
the contactless terminal is configured to communicate with NFC-enabled devices.

11. The computer-implemented method of claim 7, further comprising displaying a selection message when the wireless protocol is not supported by the operating system, the selection message requesting instructions as to whether the secure element should be used.

12. The computer-implemented method of claim 7, wherein the secure element comprises a delimited memory storing:
instructions that conform to wireless protocols; and
credential information.

13. A non-transitory computer-readable medium that stores instructions for performing a wireless communication with a system that, when executed by at least one processor, cause the at least one processor to perform operations comprising:
initiating a discovery mode to identify a contactless terminal;
identifying a wireless protocol associated with the contactless terminal;
determining whether the wireless protocol is supported by an operating system associated with the system;
when the wireless protocol is supported by the operating system:
communicating with the contactless terminal according to the wireless protocol; and
when the wireless protocol is not supported by the operating system:
receiving an instruction to use a secure communication with the contactless terminal,
initiating a secure element, the secure element executing instructions that conform to the wireless protocol, and
communicating with the contactless terminal using the secure element,
wherein
initiating a secure element comprises
determining a distance between the system and the contactless terminal; and
communicating with the contactless terminal using the secure element comprises communicating information relating to a transaction, when the distance between the system and the contactless terminal is within a predetermined range, based on the wireless protocol.

14. The medium of claim 13, wherein
the system is a mobile device comprising a near field communication (NFC) controller; and
the NFC controller comprises the secure element.

15. The medium of claim 13, wherein the secure element comprises at least one of a subscriber identification module (SIM) card or a universal integrated circuit card (UICC).

16. The medium of claim 14, wherein
the mobile device is an NFC-enabled smartphone;
the contactless terminal comprises one of a point of sale terminal, an automated teller machine, or an RFID tag; and
the contactless terminal is configured to communicate with NFC-enabled devices.

17. The medium of claim 13, wherein when the wireless protocol is not supported by the operating system, the operations further comprise displaying a selection message, the selection message requesting instructions as to whether the secure element should be used.

\* \* \* \* \*

UNITED STATES PATENT AND TRADEMARK OFFICE
CERTIFICATE OF CORRECTION

PATENT NO. : 10,380,578 B2
APPLICATION NO. : 15/813554
DATED : August 13, 2019
INVENTOR(S) : Panayiotis Varvarezis

It is certified that error appears in the above-identified patent and that said Letters Patent is hereby corrected as shown below:

In the Claims

Claim 8, Column 8, Line 11, "The computer-implemented of claim 7," should read -- The computer-implemented method of claim 7, --.

Claim 9, Column 8, Line 16, "The computer-implemented of claim 7," should read -- The computer-implemented method of claim 7, --.

Signed and Sealed this
Twenty-fourth Day of March, 2020

Andrei Iancu
*Director of the United States Patent and Trademark Office*